(12) United States Patent
Vey

(10) Patent No.: US 8,342,549 B1
(45) Date of Patent: *Jan. 1, 2013

(54) RUNNING BOARD FOR THREE WHEEL MOTORCYCLES

(76) Inventor: Jeffrey L. Vey, Whitehouse, TX (US)

( * ) Notice: Subject to any disclaimer, the term of this patent is extended or adjusted under 35 U.S.C. 154(b) by 485 days.

This patent is subject to a terminal disclaimer.

(21) Appl. No.: 12/582,772

(22) Filed: Oct. 21, 2009

Related U.S. Application Data

(63) Continuation of application No. 11/297,656, filed on Dec. 8, 2005, now Pat. No. 7,607,673.

(60) Provisional application No. 60/634,770, filed on Dec. 9, 2004.

(51) Int. Cl.
*B60R 3/00* (2006.01)

(52) U.S. Cl. .......................... 280/163; 280/291; 180/210

(58) Field of Classification Search .................. 280/163, 280/164.1, 169, 291; 180/210, 211, 215
See application file for complete search history.

(56) References Cited

U.S. PATENT DOCUMENTS

| | | | |
|---|---|---|---|
| 1,261,442 A | | 4/1918 | Rigby |
| 3,384,389 A | | 5/1968 | Polley, Jr. |
| 3,794,353 A | | 2/1974 | Oliver |
| 4,451,063 A | | 5/1984 | Snyder |
| 4,452,057 A | | 6/1984 | Davies et al. |
| 4,664,208 A | | 5/1987 | Horiuchi et al. |
| 4,728,121 A | * | 3/1988 | Graves .......................... 280/748 |
| 4,768,799 A | * | 9/1988 | Millican ...................... 280/291 |
| 4,802,684 A | | 2/1989 | Bennett et al. |
| 4,852,900 A | * | 8/1989 | Nahachewski ................ 280/291 |
| 4,925,231 A | * | 5/1990 | Hamaguchi .................. 296/78.1 |
| 4,934,721 A | | 6/1990 | Flores |
| 4,964,484 A | * | 10/1990 | Buell ............................ 180/219 |
| 5,354,086 A | | 10/1994 | Mueller |
| D389,440 S | | 1/1998 | Walters et al. |
| 5,794,976 A | | 8/1998 | Stevicks |
| 5,893,424 A | | 4/1999 | Hisada |
| 6,016,943 A | | 1/2000 | Johnson et al. |
| 6,113,121 A | | 9/2000 | Mizuta |
| 6,116,630 A | * | 9/2000 | Thomas ....................... 280/291 |
| D446,760 S | | 8/2001 | Turgeon et al. |

(Continued)

FOREIGN PATENT DOCUMENTS

JP          03217743 A2    9/1991

OTHER PUBLICATIONS

Pblice use described in Declaration of Steven L. Cartmell; Mar. 24, 2004.
Public use described in Declaration of Moncie Hall; Mar. 24, 2004.
Declaration of Jeffrey L. Vey Concerning Experimental Use; Apr. 20, 2006.

*Primary Examiner* — John Walters
(74) *Attorney, Agent, or Firm* — Jones, Walker, Waechter, Poitevent, Carrere & Denegre, LLP

(57) ABSTRACT

A running board assembly for a three wheel motorcycle including independent first and second support frame members. Each of the support frame members further includes: i) a substantially U-shaped configuration having a rear lateral section, a longitudinal section, and a front lateral section; ii) a connector on the rear lateral section adapted for connection to a motorcycle frame; and iii) a connector on the front lateral section adapted for connection to a motorcycle engine block. A running board member is connected to each of the support frame members.

16 Claims, 6 Drawing Sheets

U.S. PATENT DOCUMENTS

| | | |
|---|---|---|
| 6,270,106 B1 | 8/2001 | Maki et al. |
| D461,438 S | 8/2002 | Turgeon |
| 6,655,705 B2 * | 12/2003 | Turgeon ........................ 280/163 |
| 6,682,085 B2 * | 1/2004 | Furuhashi et al. ............ 280/163 |

* cited by examiner

RUNNING BOARD FOR THREE WHEEL MOTORCYCLES

This application is a continuation of application Ser. No. 11/297,656 filed on Dec. 8, 2005, which claimed the benefit under 35 USC §119(e) of U.S. Provisional Application Ser. No. 60/634,770 filed Dec. 9, 2004, both incorporated by reference herein in their entirety.

BACKGROUND OF INVENTION

The present invention relates to running boards and in particular to running boards for three wheel motorcycles. Running boards for three wheel motorcycles are known in the art, for example, see U.S. Pat. No. 6,655,705 which is incorporated by reference herein in its entirety. However, prior art devices possess certain disadvantages which are overcome by the present invention.

DETAILED DESCRIPTION OF INVENTION

Figure 1:
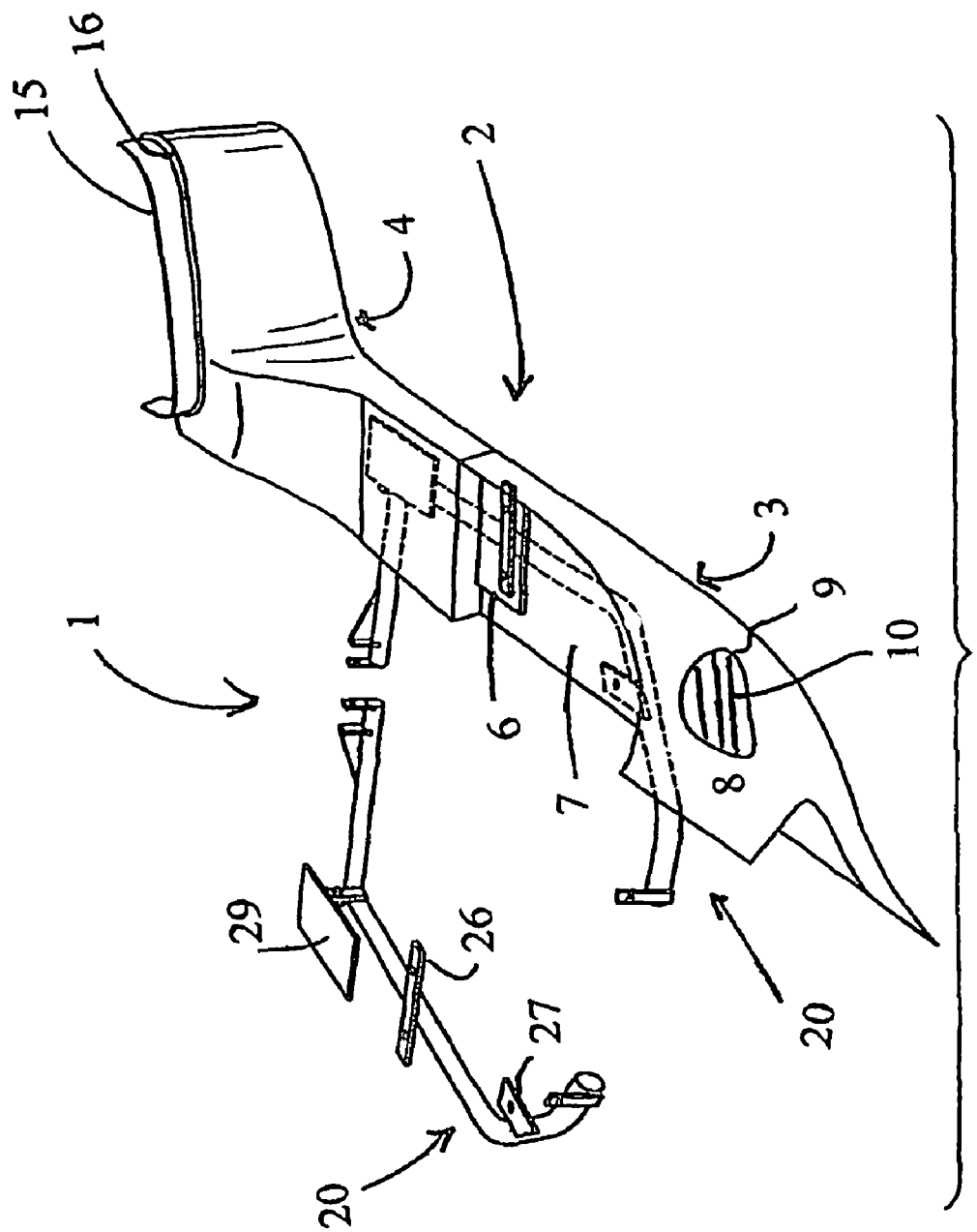
FIG. 1 is a perspective view of a running board positioned on a support frame.

FIG. 1 illustrates one embodiment of the running board assembly 1 of the present invention. This embodiment of running board assembly 1 will comprise a running board 2 positioned on a support frame member 20. This embodiment also illustrates a running board 2 which is formed of a front running board section 3 and a rear running board section 4. However, it will be understood that alternate embodiments could comprise a running board 2 formed of one section or possibly more than two sections.

The rear running board section 4 seen in the embodiment of FIG. 1 may include a fender lip 15 and a shoulder 16. When running board 2 is positioned on a three wheel motorcycle, fender lip 15 will be positioned against the front inside surface of the three wheel motorcycle's fender and the lower edge of the fender will rest upon shoulder 16. In certain embodiments, fasteners (e.g., bolts, screws, snaps, etc.) could connect the motorcycle's fender and the fender lip 15 or another type of connection be made between the fender and fender lip 15. In other embodiments, the motorcycle's fender will not be fixed to fender lip 15. In either of the above two alternatives, a section of rubber or polymer material (e.g., weather stripping) may be positioned between the inside surface of the three wheel motorcycle's fender and fender lip 15.

Running board 2 will include a floor 7. The front of running board 2 will further include a front wall 8 extending upwardly from floor 7. In one embodiment, front wall 8 will include a vent aperture 9 formed therein. In a still more preferred embodiment, vent aperture 9 will be selectively openable and closeable. In the embodiment of FIG. 1, vent vanes 10 may be operated to open or close vent aperture 9.

Figure 2:
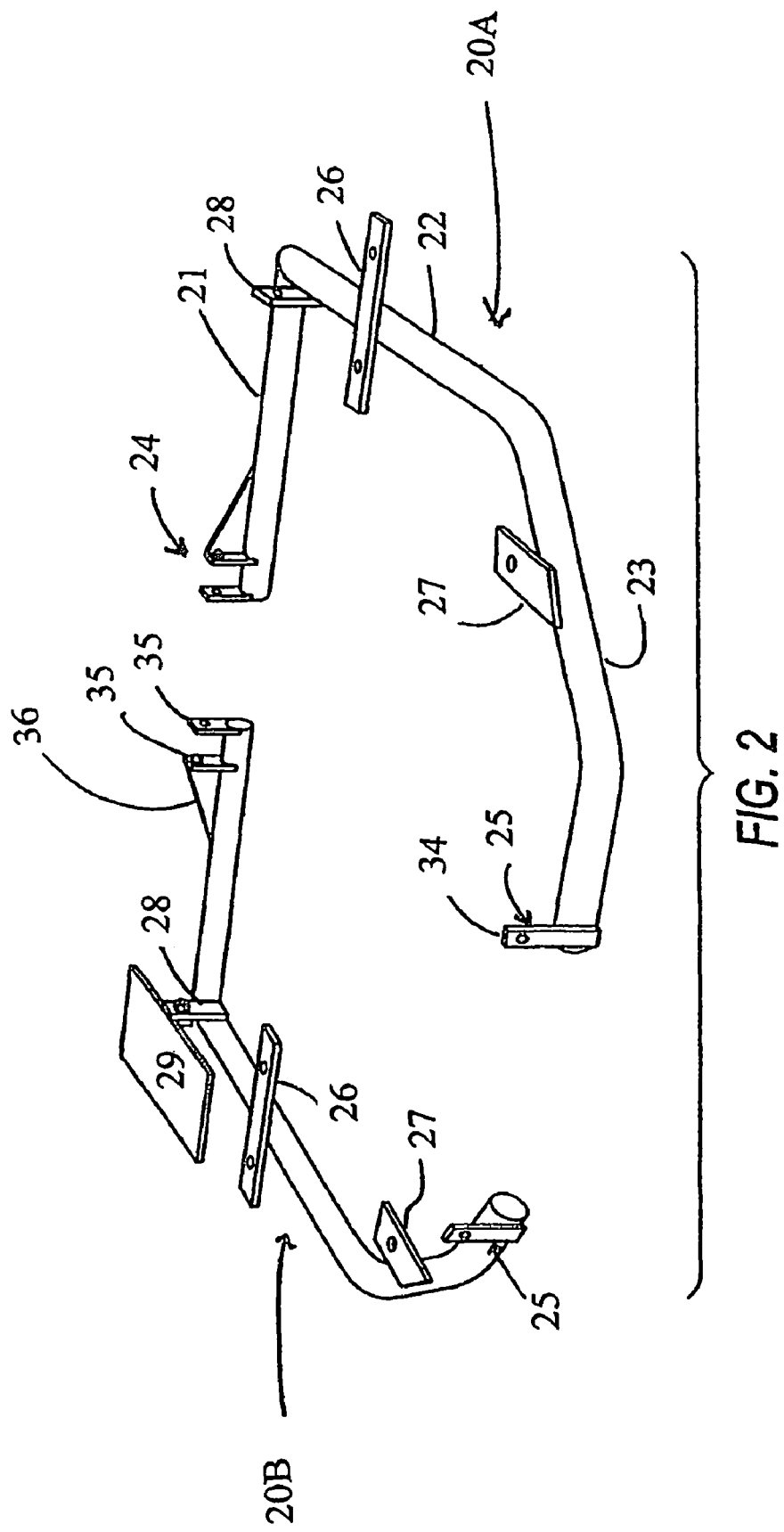
FIG. 2 is a perspective view of a pair of support frame members.

Support frame member 20 is best seen in FIG. 2. It will be understood that when installed on a three wheel motorcycle, there will generally be a right support frame member 20A and a left support frame member 20B which are mirror images of one another and support a running board 2 on each side of the three wheel motorcycle. A reference in this description to support frame member 20 without the "A" or "B" designation will apply equally to support frame members 20A and 20B.

The illustrated embodiment of support frame member 20 comprises a generally U-shaped configuration formed of rear lateral section 21, longitudinal section 22, and front lateral section 23. Section 22 is "longitudinal" in the sense that it will generally extend in a front to rear direction along the side of the three wheel motorcycle (see FIG. 3), while sections 21 and 23 are lateral in the sense that they generally extend in a side to center direction beneath the three-wheel motorcycle. Additionally, it can be seen in FIG. 2 that "U-shaped" only generally describes support frame member 20 since in the illustrated embodiment, front lateral section 23 curves inwardly (toward the center of the three wheel motorcycle—see FIG. 3) from longitudinal section 22 while rear lateral section 21 extends inwardly at a right angle to longitudinal section 22. For purposes of the present invention, support frame member 20 is considered U-shaped whenever it is formed of a longitudinal section 22 generally extending in the front to rear direction and two lateral sections 21 and 23 generally extending in a side to center direction from longitudinal section 22. In one preferred embodiment, support frame member 20 is constructed of one inch steel diameter tubing, but other embodiments could be constructed of any material of any cross-sectional shape having suitable strength.

It can be seen in FIG. 2 that support frame member 20 may have multiple connection points and brackets formed thereon. For example in the illustrated embodiment, front lateral section 23 will have a engine block connector 25 which is formed of an upstanding metal tab 34 welded to front lateral section 23 and a bolt aperture formed though upstanding tab 34. As used herein, the term "bolt" is intended to include conventional bolts along with screws, pins, rivets, and the like. Naturally, other embodiments could include other method of fixing connector 25 to the engine block (e.g., welding). Front lateral section 23 will also have welded to it a front running board bracket 27 (extending in a longitudinal direction) with a bolt aperture formed therethrough. Likewise, longitudinal section 22 has a rear running board bracket 26 (extending in a lateral direction) which is welded to longitudinal section 22 and has bolt apertures on each side of longitudinal section 22. Near the junction of longitudinal section 22 and rear lateral section 21, there is an upwardly extending support plate connector 28 having an aperture therethrough. Support plate connector 28 will be bolted to a downwardly extending connector (hidden from view in FIG. 2) on support plate 29 as seen on support frame member 20B. In FIG. 2, support frame member 20A is shown without support plate 29 to more clearly illustrate support plate connector 28. However, it will be understood that both support frame members 20A and 20B will have support plates 29 when assembled with running boards 2 as suggested by FIG. 3.

The end of rear lateral section 21 not connected to longitudinal section 22 will have a centerstand connector 24. Centerstand connector 24 will include two upwardly extending tabs 35 welded to rear lateral section 21 with apertures formed through the tabs 35. The outer tab 35 will have triangular reinforcing section 36 welded to it and rear lateral section 21.

Figure 3:
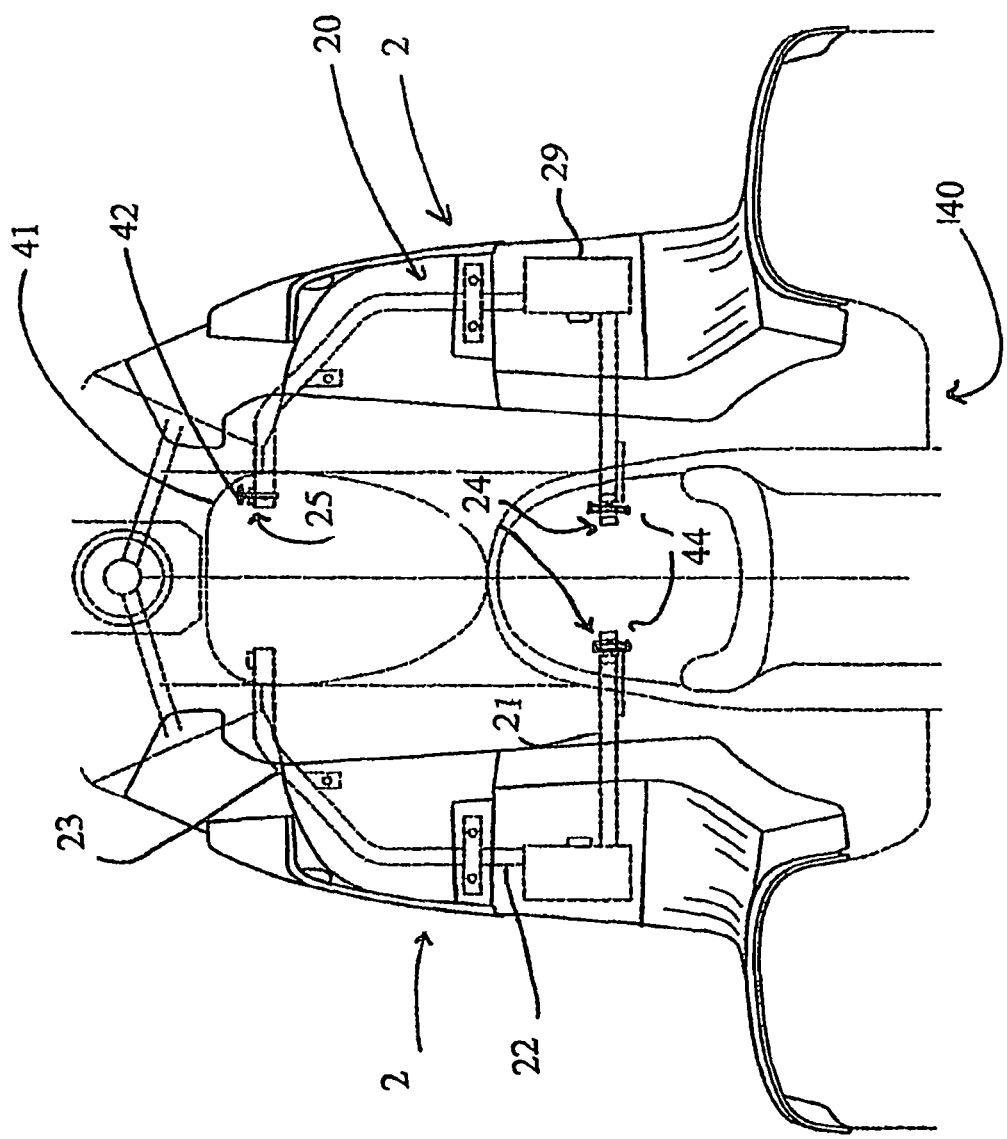
FIG. 3 is a top view of running boards mounted on the frame of a three wheel motorcycle.
Figure 5:
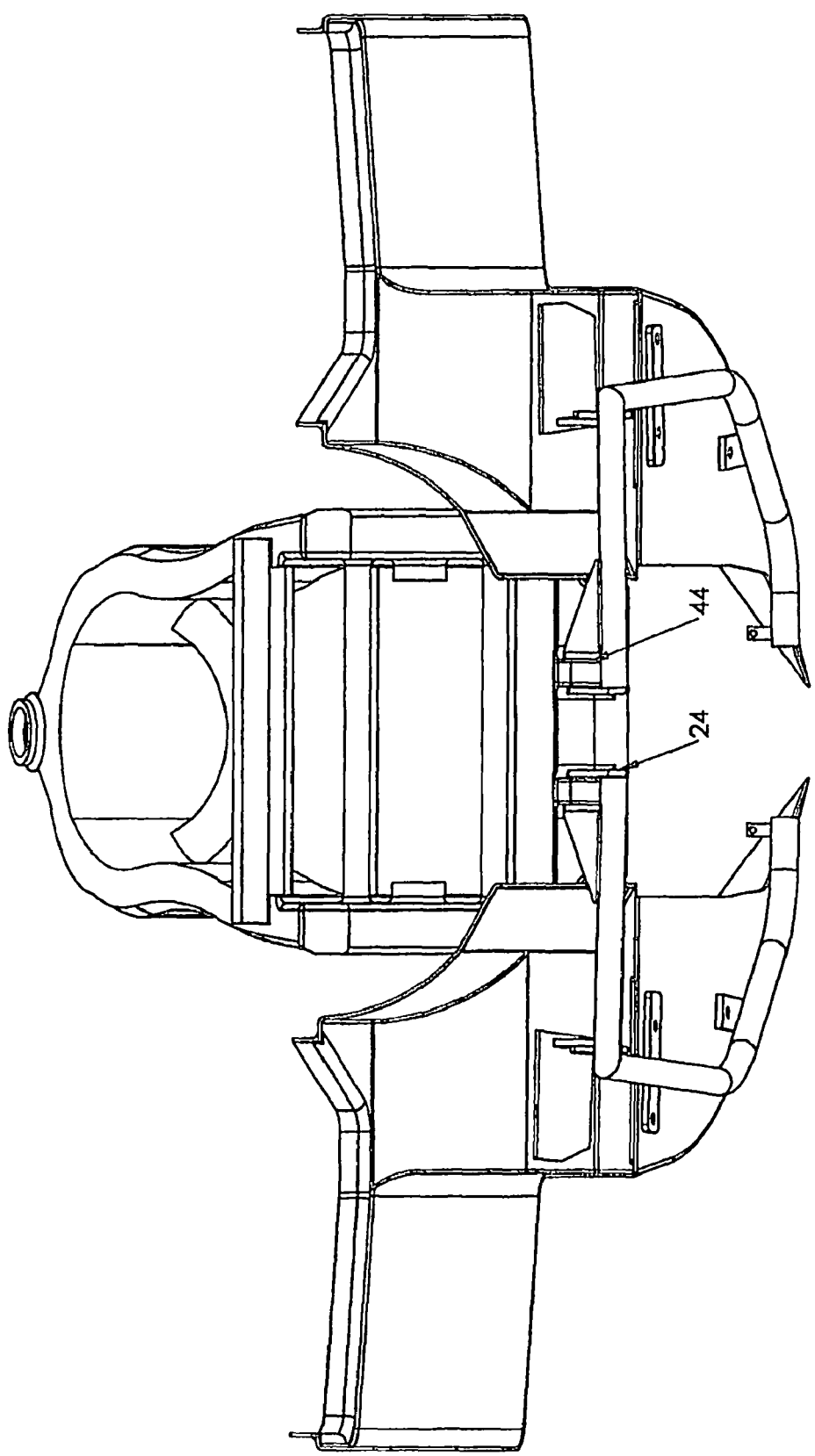
FIG. 5 illustrates the connection to the centerstand mounting lugs.
Figure 6:
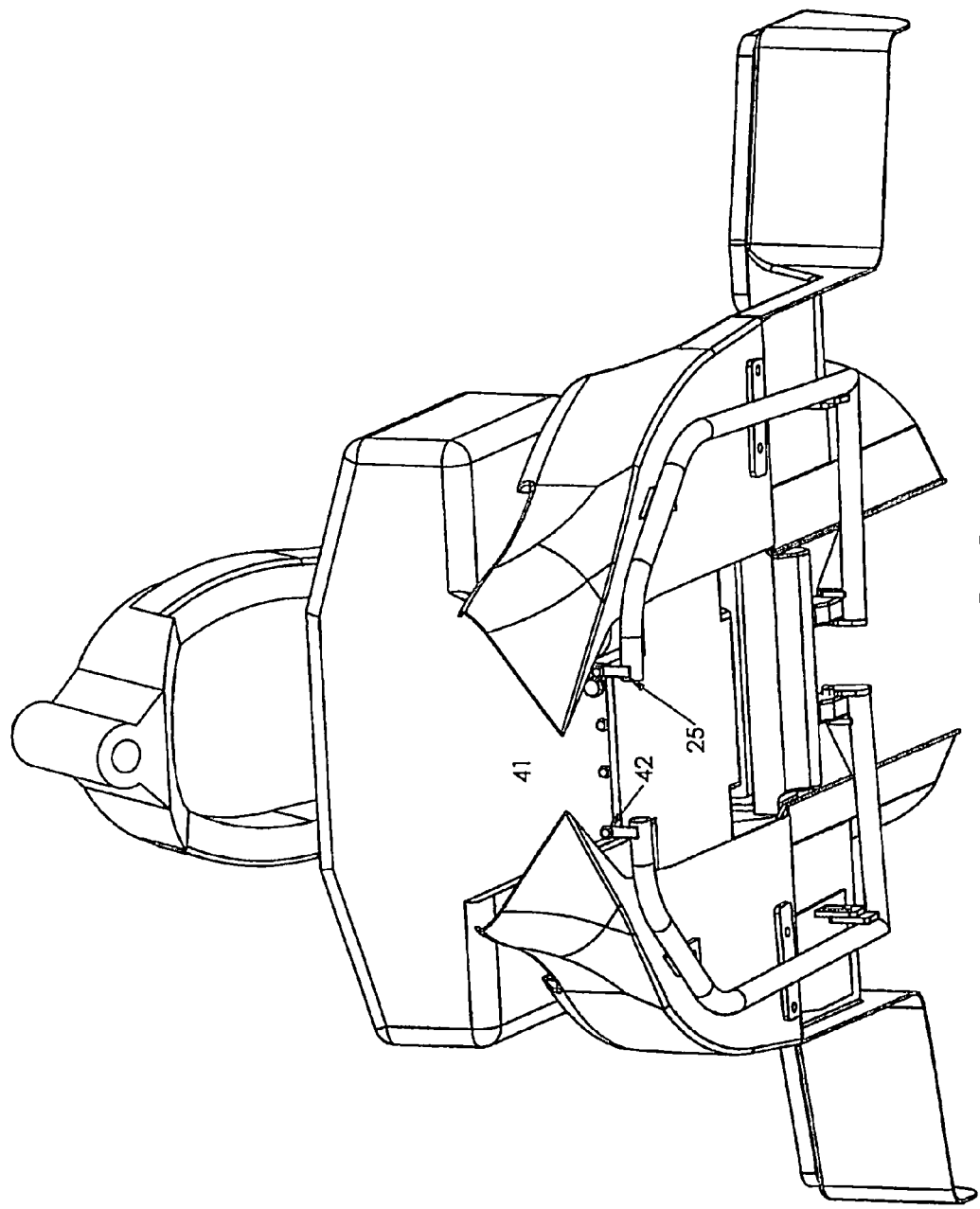
FIG. 6 illustrates the connection to the engine block.

FIG. 3 suggests how running board assemblies 1 will be mounted on a three wheel motor cycle. Motor cycle body 40 shows conceptually several basic elements of the motorcycle, including an engine block 41 and conventional centerstand mount 44. Typically, the center stand mount will include a pair of centerstand lugs to which the centerstand is rotatively mounted by a bolts passing through the lugs and centerstand. With the removal of the centerstand, the centerstand connector 24 on each support frame member 20 may be bolted to one of the centerstand lugs, thereby securing rear lateral sections 21 to the motorcycle body. FIG. 5 illustrates the center stand connector 24 on support frame members 20A and 20B engaging center stand lugs 44. On the lower front end of engine block 41, there will typically be a series of bolts engaging the engine block for various purposes. One of these bolts (indicated at 42 on FIGS. 3 and 6) will be removed on each side of engine block 41. Then engine block connector 25 on each support frame member 20 will be aligned with the bolt hole and the bolt once again threaded into the engine block, thereby securing the front lateral section 23 to the engine block.

With support frame members 20 secured to the three wheel motorcycle, running boards 2 are mounted to support frame members 20. FIG. 1 illustrates how in one embodiment, rear running board section 4 includes a tongue 6 resting on floor 7 of front running board section 3. Bolts may extend through holes drilled in tongue 6 and floor 7 and into bolt apertures formed in lateral running board bracket 26, thereby securing front section 3 and rear section 4 together on support frame member 20. It can also be seen how support plate 29 rests under and supports rear section 4, while longitudinal running board bracket 27 may be bolted to and support front section 3.

Figure 4:
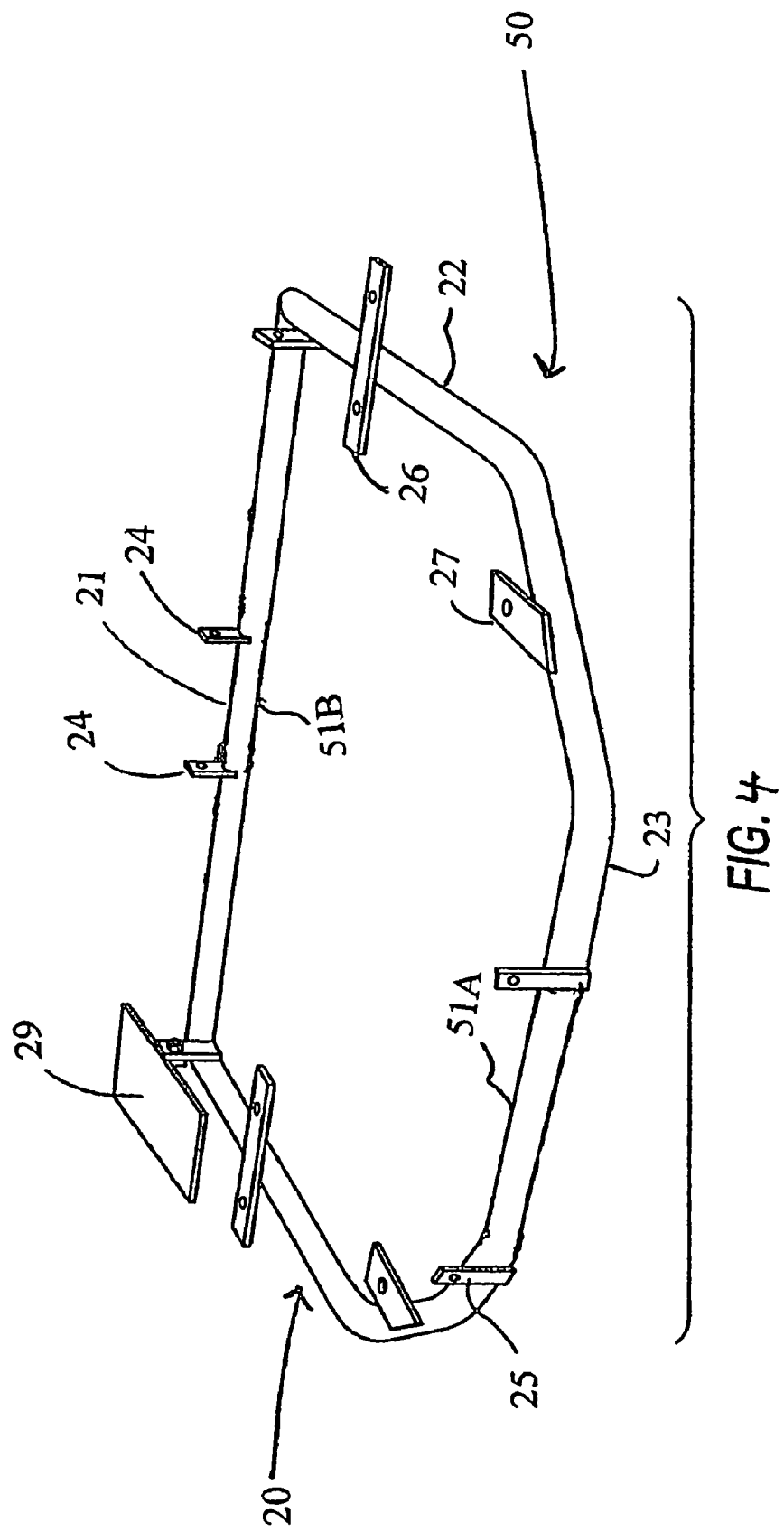
FIG. 4 is an alternative support frame design.

An alternate embodiment of frame support members 20 is seen in FIG. 4. FIG. 4 illustrates a closed loop configuration of the support frame member. Closed loop support frame member 50 will include a rear lateral section 21, a pair of longitudinal sections 22, and a front lateral section 23. Frame support member 50 is a closed loop configuration in that the left and right support frame member 20A and 20B seen in FIGS. 1-3 are in effect joined by bridging sections 51A and 51B in order to form a continuous ring or loop. Frame support member 50 is otherwise substantially similar to earlier frame support members 20 in that it includes centerstand connectors 24, engine block connectors 25, lateral and longitudinal running board brackets 26 and 27, and support plates 29.

Although the present invention has been described in terms of specific embodiments, those skilled in the art will see many obvious modifications and variations. All such modifications and variations are intended to come within the scope of the following claims.

I claim:

1. A three wheel motorcycle with a running board assembly positioned thereon, said motorcycle including a motorcycle frame, said assembly comprising:
   a. independent first and second support frame members, each of said support frame members further comprising:
      i. a substantially U-shaped configuration having a rear lateral section, a longitudinal section, and a front lateral section;
      ii. a connector on said rear lateral section connecting to a centerstand mount on said motorcycle frame;
      iii. a connector on said front lateral section connecting to said motorcycle forward of said centerstand mount; and
   b. a running board member connected to each of said support frame members.

2. The three wheel motorcycle according to claim 1, wherein said rear lateral section connector comprises two upstanding tabs with apertures formed therethrough.

3. The three wheel motorcycle according to claim 1, wherein said front lateral section connector comprises an upright tab adapted for bolting to said engine block.

4. The three wheel motorcycle according to claim 1, wherein said support frame members each have at least two horizontal running board brackets with bolt apertures therethrough.

5. The three wheel motorcycle according to claim 4, wherein one of said running board brackets is oriented in a generally lateral direction and one is oriented in a generally longitudinal direction.

6. The three wheel motorcycle according to claim 1, wherein each of said support frame members has a support plate attached thereto.

7. The three wheel motorcycle according to claim 6, wherein said rear lateral section connector attaches to a centerstand mount on said frame.

8. The three wheel motorcycle according to claim 1, wherein said running board member comprises a front end, said running board front end comprising an upwardly extending front wall with a vent aperture formed in said front wall.

9. The three wheel motorcycle according to claim 8, wherein vent aperture is selectively closeable.

10. The running board assembly according to claim 1, the running board member further comprising at least two sections.

11. A running board assembly for a three wheel motorcycle, said running board assembly comprising:
    a. independent first and second support frame members, each of said support frame members further comprising:
       i. a substantially U-shaped configuration having a rear lateral section, a longitudinal section, and a front lateral section;
       ii. a connector on said rear lateral section adapted for connection to a motorcycle frame;
       iii. a connector on said front lateral section adapted for connection to a motorcycle engine block; and
    b. a running board member connected to each of said support frame members.

12. The running board assembly according to claim 11, wherein said rear lateral section connector attaches to a center stand mount on said motorcycle frame.

13. The running board assembly according to claim 11, wherein said front lateral section connector comprises an upright tab adapted for bolting to said engine block.

14. The running board assembly according to claim 11, wherein each of said support frame members has a support plate attached thereto.

15. The running board assembly according to claim 11, wherein said running board member comprises a front end, said running board front end comprising an upwardly extending front wall with a vent aperture formed in said front wall.

16. The running board assembly according to claim 11, the running board member further comprising at least two sections.

* * * * *